No. 856,996. PATENTED JUNE 11, 1907.
E. A. CUSTER & R. A. PITMAN.
APPARATUS FOR COATING PIPES AND OTHER ARTICLES.
APPLICATION FILED FEB. 25, 1907.

WITNESSES:
Wilhelm Vogt
Thomas M. Smith

INVENTORS
Edgar A. Custer & Robt.
A. Pitman
BY
J. Walter Douglas
ATTORNEY.

No. 856,996. PATENTED JUNE 11, 1907.
E. A. CUSTER & R. A. PITMAN.
APPARATUS FOR COATING PIPES AND OTHER ARTICLES.
APPLICATION FILED FEB. 25, 1907.

No. 856,996. PATENTED JUNE 11, 1907.
E. A. CUSTER & R. A. PITMAN.
APPARATUS FOR COATING PIPES AND OTHER ARTICLES.
APPLICATION FILED FEB. 25, 1907.

UNITED STATES PATENT OFFICE.

EDGAR A. CUSTER AND ROBERT A. PITMAN, OF PHILADELPHIA, PENNSYLVANIA, ASSIGNORS TO TACONY IRON WORKS, OF PHILADELPHIA, PENNSYLVANIA, A CORPORATION OF PENNSYLVANIA.

APPARATUS FOR COATING PIPES AND OTHER ARTICLES.

No. 856,996.     Specification of Letters Patent.     Patented June 11, 1907.

Application filed February 25, 1907. Serial No. 359,286.

*To all whom it may concern:*

Be it known that we, EDGAR A. CUSTER and ROBERT A. PITMAN, citizens of the United States, both residing at the city of Philadelphia, in the county of Philadelphia, State of Pennsylvania, have jointly invented certain new and useful Improvements in Apparatus for Coating Pipes and other Articles, of which the following is a specification.

Our invention has relation to an apparatus for coating pipes and other articles; and in such connection it relates more particularly to means for separately conducting pipes or other articles through a heating furnace and through a vessel containing coating material; and to means for supporting and for transferring the supporting means from one of the conducting means to the other thereof.

The principal objects of our invention are, first, to provide an apparatus for coating pipes or other articles, with endless chains or conveyers to slowly conduct the articles to be coated through a furnace and to quickly lower and dip the same into a vat containing the coating material and to rapidly lift the same therefrom; second, to provide the apparatus with carriers for supporting the articles to be coated and for conducting the same through a furnace and through a vat by traveling over a horizontally and partially over a vertically arranged extension of the frame-work or structure; third, to provide the horizontal portion of the frame-work or structure with means for automatically preventing the carriers from traveling otherwise than with a speed and in a position in which the same are intended to travel; fourth; to provide the apparatus with means for transferring the carriers from a horizontal supporting frame-work upon a vertically moving chain and then back from this chain upon a frame to be moved along the same by the horizontal chain; fifth, to provide the apparatus with a retarding means for the carriers to control their movement during transfer from the frame and the horizontal chain upon the vertically moving chain; and sixth, to provide the apparatus with means for automatically disengaging the pipes or other articles from hangers supported by the carriers.

The nature and objects of our invention will be more fully understood from the following description taken in connection with the accompanying drawings forming part hereof, in which.

Figure 1:
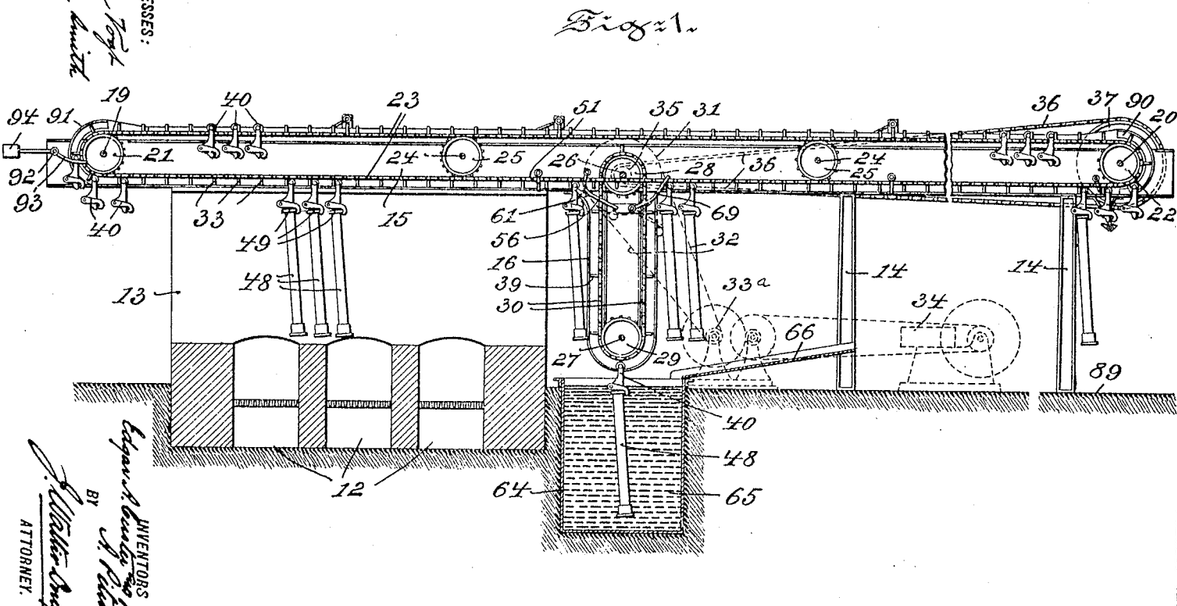
Figure 1 is a view, illustrating partly in side elevation and partly in section, an apparatus for coating pipes or other articles, showing a frame-work, carriers for pipes, a horizontally and vertically arranged endless chain for respectively moving the carriers over the frame-work or structure and for conducting the pipes suspended therefrom through a furnace and for dipping the same into a vat containing the coating material, means for transferring the carriers from the frame-work to the vertical chain and from the same back to the frame, and means for actuating the chains with varying speeds, all embodying main features of our said invention. Figs: 2 and 3 are detail views enlarged illustrating partly in section and partly in side and end elevations, a carrier and frame for supporting the same, when traveling in a horizontal plane. Figs: 4 and 5 are similar views, illustrating partly in section and partly in side and end elevations, weighted arms for automatically controlling the position of the carriers upon the frame-work and for retarding the movement of the same when exceeding in speed the movement imparted to the carriers by the horizontal chains. Figs: 6 and 7 are similar views, illustrating partly in side and end elevations and partly in section weighted pushers for transferring the carriers from the supporting frame to the vertically arranged chains. Figs: 8 and 9 are detail views respectively on enlarged and reduced plans of weighted arms for shifting the carriers from the vertical chains back upon the horizontal portion of the frame-work; and Figs: 10 and 11 are detail views, enlarged, illustrating partly in section and partly in end and side elevations means for automatically releasing the pipes from hangers suspended from the carriers.
Figure 7:
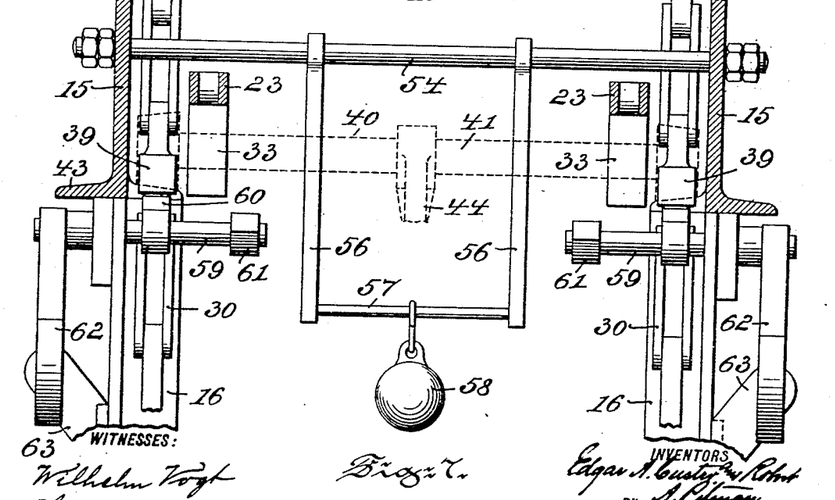
Figures 8, 9:
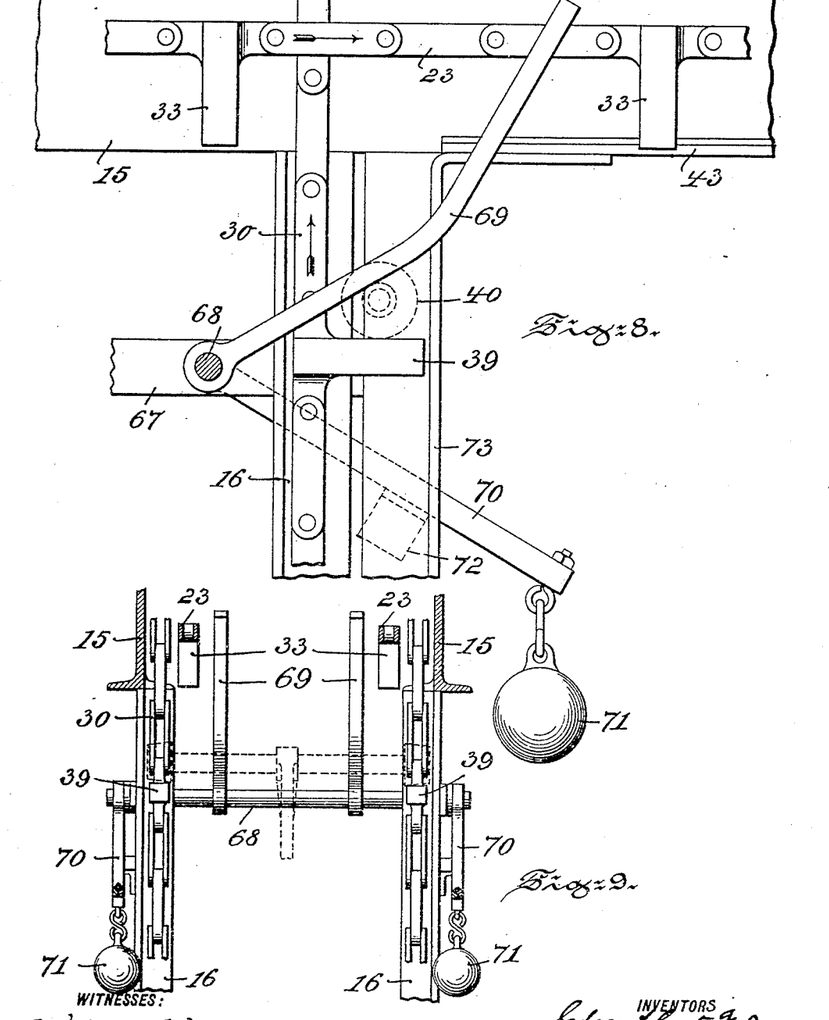
Figure 10:
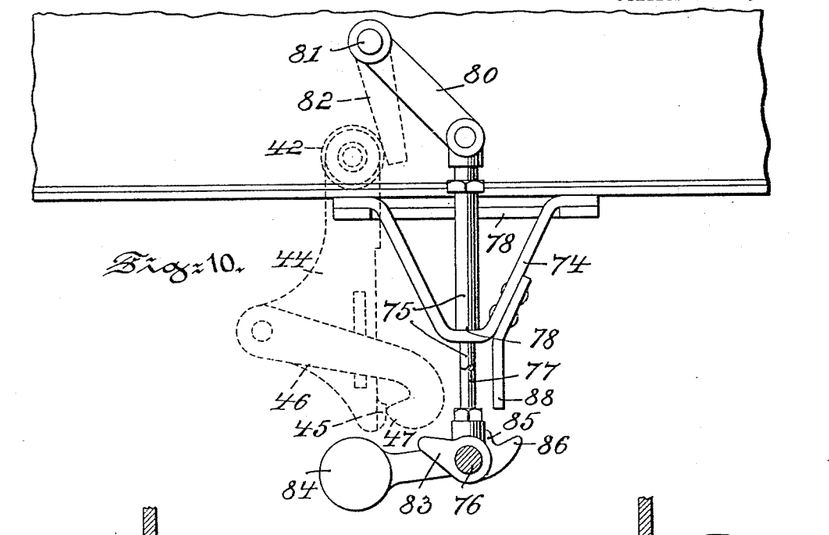
Figure 11:
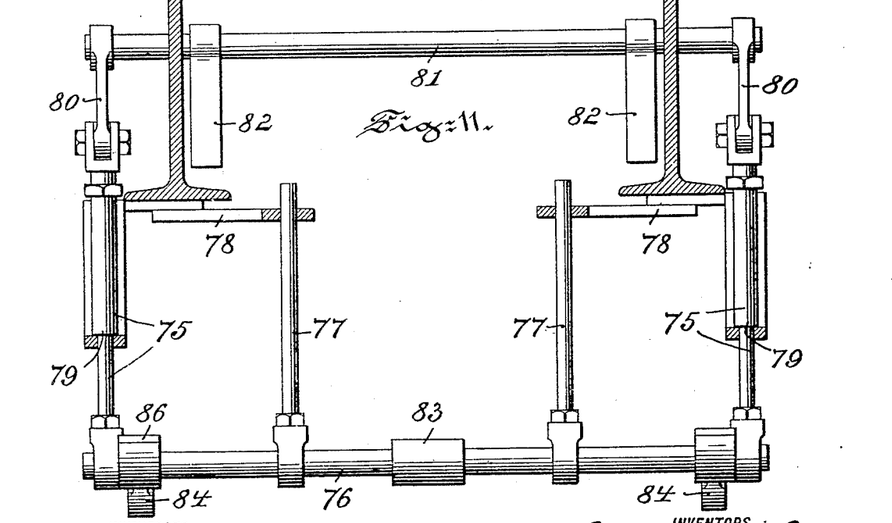

Referring to the drawings with reference to Fig: 1 thereof, 12 represents a series of furnaces the side walls 13 thereof, in conjunction with columns 14 serve to support a frame-work or structure, consisting preferably of horizontally arranged beams 15, having vertically arranged extensions 16. The beams 15, at each end are provided with shafts 19 and 20, upon which are respectively mounted chain-wheels 21 and 22, serving to support endless chains 23. Intermediate of the shafts 19 and 20, the beams 15, are provided with additional shafts 24, carrying chain-wheels 25, which serve to assist in the support of the chains 23. In addition to the shafts 19, 20 and 24, the beams 15, and extensions 16, are provided respectively, with shafts 26 and 27, carrying chain-wheels 28 and 29, which support endless chains 30, arranged vertically and outside of the horizontally arranged set of chains 16, as shown in Fig: 7. The shaft 26, and thus the chain-wheels 28, and chains 30, are positively driven by a pulley 31, secured to the shaft 26, which in turn is actuated by a belt 32, driven by a pulley 33$^a$. This belt is actuated by an engine 34, preferably in the manner shown in dotted lines in Fig: 1. The shaft 26, by means of a chain-wheel 35, and chain 36, serves to transmit the rotary movement to the shaft 20, through the intervention of a chain-wheel 37, secured thereto and over which the chain 36 passes.

As shown in Fig: 1, the proportions of the pulleys 31 and 33$^a$, and chain-wheels 35 and 37, are such as to drive the chains 23 and 30, with varying speeds for a purpose to be presently described. Both chains 23 and 30, serve to conduct carriers 40, for articles to be coated over the beams 15, and their extensions 16, for which purpose certain of the links of each of the chains 23 and 30, at predetermined intervals are provided with laterally extending fingers 33 and 39.

Figure 2:
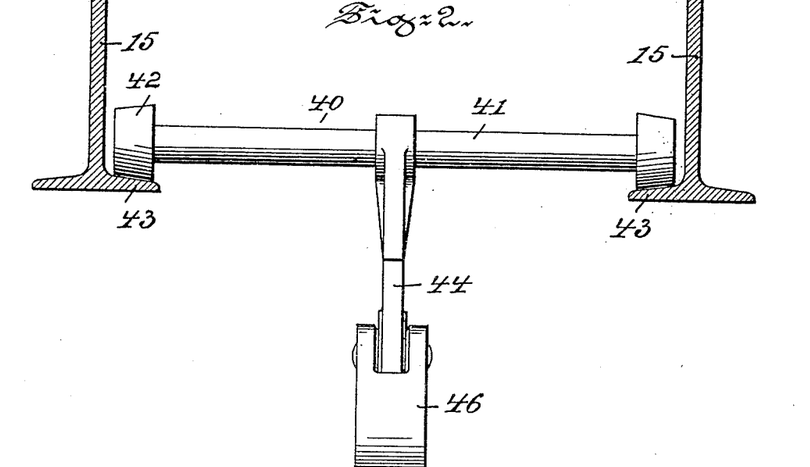
Figure 3:
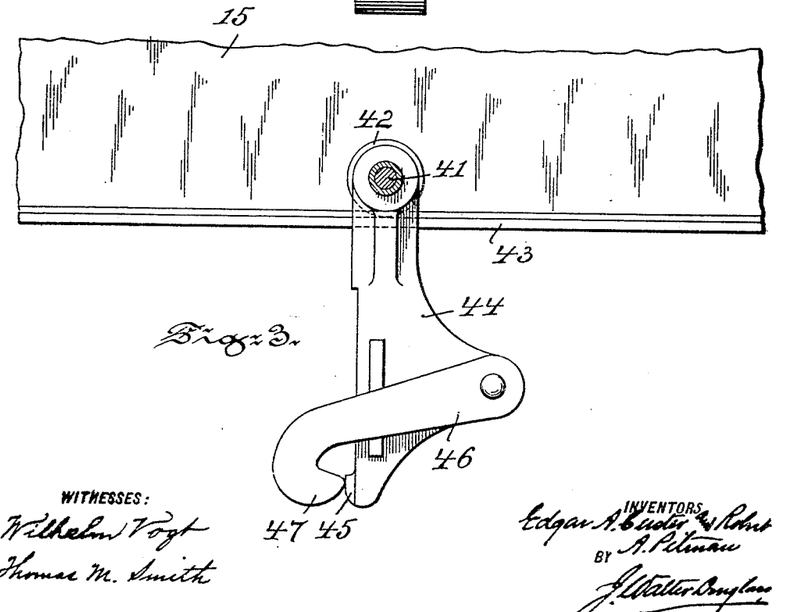

As shown in Figs: 2 and 3, each of the carriers 40, consists of a shaft 41, provided with rollers 42, which by traveling upon the flange 43, of the beams 15, are supported by the same. From each of the carriers 40, is suspended a hanger 44, provided with a projection or lip 45, to which hanger is pivotally secured a grip or clamping arm 46, having hook-shaped ends 47. By this arrangement of the hanger and the grip the articles to be coated for instances pipes 48, are readily connected therewith, by merely introducing the end of the same between the lip 45, and the grip 46, of the hanger 40, and permitting the hooked ends 47, of the grip 46, to engage the flange 49, of the pipes 48. The pipes 48, will thus be held suspended from the hanger 44, of the shaft 41, of the carriers 40, in the manner as shown in Fig: 1, and their insertion in the hanger must take place in front of the furnace 12, at the left hand or charging end of the beams 16, in said figure. The shaft 41, of the carrier 40, by means of the fingers 33, of the chains 23, is now slowly pushed over the lower flange 43, of the beams 15, and the pipes 48, to be coated are thus slowly conveyed by the carrier over the furnaces 12, toward the vertically arranged chains 30.

Figure 4:
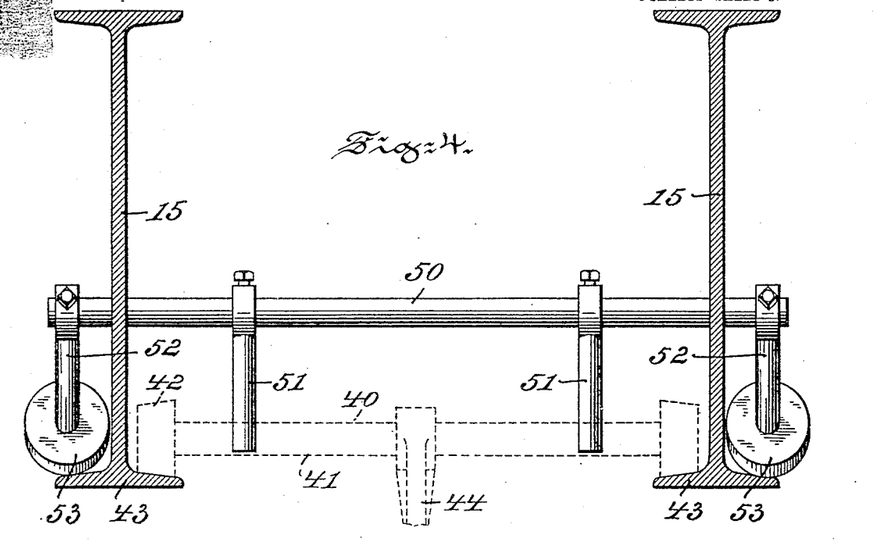
Figure 5:
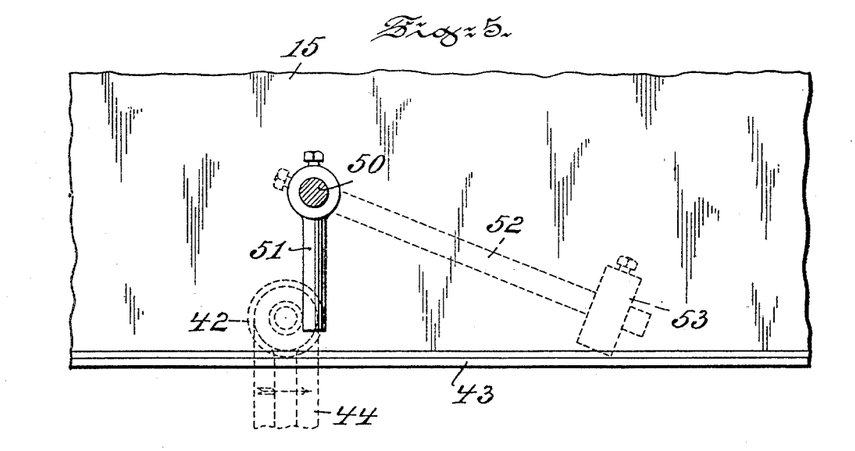

In order to maintain the shafts 41, of the carriers 40, in a right angular position with respect to the beams 15, and to return the same to this position, if removed therefrom, the following preferred mechanisms are employed:

As shown in Figs: 1, 4 and 5, in the beams 15, at certain intervals are arranged shafts 50, provided with downwardly projecting retarding fingers 51, which extend in the path of travel of the carriers 40. The fingers 51, are held in their normal vertical position by arms 52, secured to the ends of the shafts 50, which are provided with weights 53, normally resting upon the flange 43, of the beams 15. The shaft 41, of the carriers 40, when out of the normal position with respect to the beams 15, will with the advancing end contact with one of the fingers 51, which, however, under the pressure of both weights 53, of the arms 52, will resist movement by the shaft 41, and will thus retard the movement of the advancing end of the same, until the shaft 41, contacting with both fingers 50, have thus been shifted back to normal position. In this position the carrier shaft 41, will be moved forward by the fingers 33, of the chains 23, and will move the retarding fingers 51, outward against the pressure of the weights 53, until the same clear the carrier shaft 41, after which the fingers 51, return to their normal position as shown in Figs: 4 and 5. The carriers 40, having slowly conveyed the pipes 48, over the furnaces 12, to thoroughly heat the same, are then transferred to the vertically arranged chains 30, which move at a greater rate of speed than the chains 23, to quickly convey and to dip the same into a vat or receptacle 64, arranged directly below the chains 23, and containing tar or any other suitable coating material 65.

Figure 6:
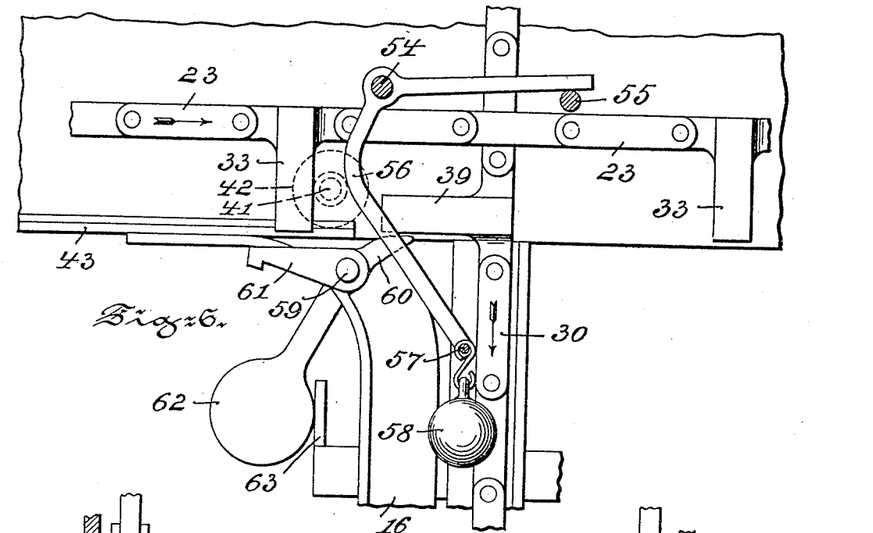

The preferred mechanism for transferring the carriers 40, from the beams 15, to the chains 30, are as follows:—As shown in Figs. 1, 6 and 7, in the beams 15, are arranged cross shafts 54 and 55, of which the shaft 54, serves to movably support two lever arms 56, united at their lower ends by a cross-rod 57, carrying a weight 58, which tends to hold the upper free ends thereof, in engagement with the cross-shaft 55, and thus maintaining the lever-arms 56, in a certain operative position. The chains 23, having moved the carrier for the pipes 48, to be coated toward the chains 30, pushes the same against the lever-arms 56, which under the influence of the weight 58, first shifts the shaft 41, of the carrier 40, into the proper operative position, if removed therefrom, and then holds the same in this position during the movement of the carrier 40, upon the fingers 39, of the chain 30.

In order to insure the shifting of the carrier upon the faster moving chain 30, the transferring of the same from the beams 15, to this chain is accomplished by means of the chain itself, in the following manner: In the upper end of each of the beam extensions 16, is movably arranged a shaft 59, to which are rigidly secured within the extensions 16, a tripping arm 60, and a transfer-arm 61, and outside the extension a weight 62, which by resting against a projection 63, of the extension 16, holds the weights 62, and by the same and shaft 59, the tripping and transfer arms 60 and 61, in proper operative position. The tripping arm 60, being held by the shaft 59, in the path of movement of the fingers 39, of the chain 30, is engaged and depressed by the same, thus turning the shaft 59, in the extension 16, which movement brings the transfer-arm 61, into engagement with the shaft 41, of the carrier 40, and shifts the same upon a finger 39, of each of the chains 30. After the carrier 40, with the pipe 48, to be coated suspended therefrom has been placed upon fingers 39, of the chains 30, occupying the same position in a horizontal plane, the tripping-arms 60, slide over the fingers 39, and after being disengaged therefrom under the influence of the weights 62, return to normal position. The carrier 40, and the pipes 48, by means of the chain 30, is now rapidly conducted into the vat 64, containing the coating material 65, so as to prevent as much as possible loss of heat imparted to the pipe 48, by the furnaces 12. After the fingers 39, of the chains 30, supporting the carrier 40, at its respective ends have reached a vertical central position in their travel around the lower chain-wheels 29, the same leaves the carrier 40, and ascends free of the same in the beam extensions 16, as shown in Fig: 1. The pipe 48, completely submerged in the coating material 65, in the vat 64, is now for a certain period of time held stationary in the coating material 65, which is thus permitted to completely and evenly attach itself to the heated pipe before the same is again removed from the vat, 64, by the next fingers 39, of the chains 30. These fingers raise the carrier 40, and pipe 48, suspended therefrom and rapidly conduct the same back upon the beams 15, on which they are slowly conducted by the chains 23, over a drain or dripping-pan 66, held in an inclined position below the pipes 48, as shown in Fig: 1.

The preferred mechanism, which transfers the carrier 40, at the point where the quick moving chains 30, again meet the slow moving chains 23, is as follows:—As shown in Figs: 1, 8 and 9, to the beam-extension 16, are secured cross-bars 67, serving as a support for a shaft 68, to which within the extension 16, and beams 15, are rigidly secured pusher arms 69, and outside thereof lever-arms 70, each carrying a weight 71. The pusher arms 69, by means of the supports 72, of the extensions 16, carrying the lever-arms 70, are held in the path of travel of the carrier 40. As soon as the carrier is brought into engagement with the pusher-arms 69, the same by the pressure of the weights 71, is shifted against a retaining flange 73, of the extensions 16, and as soon as the flange 43, of the beams 15, is reached, upon these flanges. Certain of the fingers 33, of the chains 23, will again be brought into engagement with the carrier 40, and shift the same slowly toward the right hand or discharge end of the beams 15. The pipes 48, having thus been quickly lowered and raised from the vat 64, retain sufficient heat to accelerate the drying of the coating material adhering thereto, while that portion thereof which in the form of drippings leaves the pipes 48, descends into the drain 66, and by the same is conducted back into the vat 64. The slow advance of the pipes 48, toward the discharge end of the beams 15, permits of the complete drying of the coating of the same before reaching the end at which point the pipes are automatically disengaged from the carrier 40, by the following preferred mechanism:—As shown in Figs: 1, 10 and 11, to the beams 15, are secured brackets 74, which support rods 75, carrying at their lower ends a cross-rod 76. The cross-rod 76, serves to support two vertically extending arms 77, each having a range of sliding movement within a guide 78, secured to the brackets 74. Each of the rods 75, by means of a shoulder 79, is held by the respective brackets 74, in proper vertical position, and to their upper free ends are secured links 80, connecting the same with a cross-shaft 81, carried by the beams 15. To the cross-shaft 81, within the beams 15, are rigidly secured arms 82, extending into the path of travel of the rollers 42, of the carrier-shaft 41. To the shaft 76, and between the arms 77, thereof, is rigidly secured a finger 83, which is held in operative position by weighted arms 84, rigidly secured to the shaft 76, and resting with a portion 85, against the rods 75. As soon as the rollers 42, of the carrier 40, are brought into engagement with the arms 82, the same will swing the arms sidewise, which movement is transmitted to the shaft 81, and by means of the links 80, raising the rods 75, and by the same the cross-rod 76, and arms 77, which by being placed in front of the carrier 40, prevents the advance of the same beyond the rods 75. At this time the grip 46, with its hooked ends 47, of the hanger 44, of the carrier 40, has been brought directly above the finger 83, of the cross-rod 76, which is thus brought into engagement with the hooked ends 47, of the grip 46, and lifts the same, while a finger 86, of the weighted lever-arms 84, is brought into engagement with a stop 88, projecting from each of the brackets 74. By the further upward movement of the cross-rod 76, the stop 88, now arresting the movement of the fingers 86, by the intervention of these fingers, will turn the cross-rod 76, against the pressure exerted thereon by the weighted arms 84, by which turning movement, the finger 83, of the cross-rod 76, will completely disengage the hooked ends 47, of the grip 46, from the flange 49, of the pipe 48. The pipe thus freed from the hanger 44, of the carrier 40, drops upon the floor 89, of the apparatus, or may be disposed of in any other preferred manner. The carriers having thus reached the discharge end of the beams 15, of the supporting structure are held during the movement of each of the chains 23, over the chain-wheel 22, in engagement with the fingers 33, thereof, by a guide 90, carried by each of the beams 15, as shown in Fig. 1. From the chain 23, the carriers 40, are conducted upon supports, not shown, carried by the beams 15, upon which the same by means of the fingers 33, of the chains 23, are conducted back to the charging end of the beams 15, at which portion a second guide 91, carried by each of the same, assists in the conducting of the carriers 40, upon the flange 43, of the beams 15, during the travel of each of the chains 23, over the chain-wheels 21.

In order to prevent the quick descent of the carriers 40, during their travel over the chain-wheel 21, to each of the beams 15, of the structure and sidewise of the guides 91, for the chains 23, in the point 92, is pivotally secured a lever-arm 93, which when the carrier 40, loses its support on the fingers 33, of the chains 23, serves to support the carrier in the manner shown in Fig. 1. Each of the lever-arms 93, is provided with a weight 94, which by counterbalancing the weight of the carriers 40, permits of a gradual descent of the same, upon the flange 43, of the beams 15.

Having thus described the nature and objects of our invention, what we claim as new and desire to secure by Letters Patent is:—

1. In an apparatus of the character described, a furance, a vat for coating material, one set of endless chains extending horizontally over said furnace and vat and beyond the same, a second set of endless chains extending vertically and terminating above said vat and located outside of said horizontally arranged chains, the latter adapted to slowly conduct articles to be coated over said furnace and said vertically arranged chains adapted to quickly lower and raise the articles into and out of said vat.

2. In an apparatus of the character described, a furnace, a vat for coating material arranged adjacent to said furnace, carriers for materials to be coated, and two sets of endless chains, one set of said chains arranged to slowly conduct the carriers disconnected from said chains and articles suspended from said carriers over said furnace and the other set of said chains arranged so as to conduct the carriers and by the same the articles into and out of said vat.

3. In an apparatus of the character described, a furnace, a vat for coating material, endless chains, carriers disconnected from said chains, a structure for supporting said carriers and chains, certain of said chains arranged to move said carriers and by the same articles to be coated over said structure and over said furnace and certain other of said chains arranged to conduct said carriers and by the same, said articles into and out of said vat.

4. In an apparatus of the character described, a furnace, a vat for coating material, a structure, carriers for articles to be coated movably arranged on said structure, endless chains supported by said structure and arranged to alternately move said carriers and articles suspended therefrom over said furnace, and to lower and raise said carriers and by the same, articles into and out of said vat and means for transferring the carriers from one chain to the other.

5. In an apparatus of the character described, a furnace, a vat for coating material, a structure, carriers for articles to be coated movably arranged on said structure, endless chains arranged to respectively move in horizontal and vertical planes, supported by said structure, the set of horizontally arranged chains adapted to move said carriers and the articles on said structure over said furnace and beyond the same, and the set of vertically arranged chains adapted to conduct the carriers and by the same, said articles suspended therefrom into and out of said vat, means for automatically transferring the carriers from the structure to the vertically moving chains, and means for automatically conducting the carriers from the vertically moving chains back to the structure and into re-engagement with the horizontally moving chains.

6. In an apparatus of the character described, a furnace, a vat for coating material, a structure, carriers for articles to be coated movably arranged on said structure, endless chains arranged respectively to move in horizontal and vertical planes, supported by said structure, the set of horizontally arranged chains adapted to move said carriers and the articles on said structure over said furnace and beyond the same, and the set of vertically arranged chains adapted to conduct the carriers and by the same, said articles suspended therefrom into and out of said vat, means for automatically transferring the carriers from the structure to the vertically moving chains, means for automatically conducting the carriers from the vertically moving chains back to the structure and into re-engagement with the horizontally moving chains and means actuated by said carriers and adapted to disengage said articles therefrom.

7. In an apparatus of the character described, a furnace, a vat for coating material, a structure, carriers for articles to be coated adapted to travel on said structure and two sets of endless chains arranged respectively in horizontal and vertical planes, one set adapted to move the carriers and articles suspended therefrom over said structure and through said furnace and the other set adapted to lower and raise said articles into and out of said vat and to hold the articles stationary in said vat by releasing and then re-engaging said carriers.

8. In an apparatus of the character described, a structure, carriers for articles to be coated, endless chains having projections adapted to engage said carriers and to move the same over said structure, and means supported by said structure adapted to automatically move said carriers back to their position with respect to said structure when removed therefrom.

9. In an apparatus of the character described, a structure, carriers for articles to be coated supported by said structure, endless chains carried by said structure and arranged respectively, to move in horizontal and vertical planes thereon, fingers connected with said chains and adapted to engage said carriers and move the same over said structure and means carried by said structure and actuated by the vertically arranged chains adapted to transfer said carriers from said structure upon the fingers of the vertical chains.

10. In an apparatus of the character described, a structure, carriers for articles to be coated supported by said structure, endless chains carried by said structure and arranged respectively, to move in horizontal and vertical planes thereon, fingers connected with said chains and adapted to engage said carriers and to move the same over said structure, and means carried by said structure and actuated by the vertically arranged chains adapted to transfer said carriers from said structure upon the fingers of the vertical chains, and the fingers of said vertical chains arranged to permit of the disengagement of said carriers therefrom and of the re-engagement of the same.

11. In an apparatus of the character described, a structure, carriers supported by said structure, each of said carriers having a hanger and a grip pivotally connected therewith, said hanger and grip arranged to engage articles to be coated and hold the same suspended from said carriers, endless chains, each having fingers adapted to engage said carriers and move the same over said structure, a shaft supported by said structure having means extending in the path of travel of said carriers, a second shaft supported by said first shaft having projecting means, said first shaft adapted when said carriers abut against said projecting means to raise said second shaft and the means of said second shaft when raised to disengage the grip from said articles to disconnect the same from said hanger.

12. In an apparatus of the character described, a structure, carriers supported by said structure, each of said carriers having a hanger and a grip pivotally connected therewith, said hanger and grip arranged to engage articles to be coated and hold the same suspended from said carriers, endless chains, each having fingers adapted to engage said carriers and move the same over said structure, a series of shafts carried by said structure, each having arms adapted to automatically move said carriers back to their position with respect to said structure when removed therefrom, a second shaft having arms extending into the path of travel of said carriers, and a third shaft movably supported by said second shaft having a finger, said second shaft when actuated by said carriers abutting against the arms adapted to raise said third shaft and the finger of said third shaft arranged when actuated to disengage the grip from said article to disconnect the same from said hanger.

13. In an apparatus of the character described, a structure, carriers supported by said structure, each of the said carriers having a hanger and a grip pivotally connected therewith, said hanger and grip arranged to engage articles to be coated and hold the same suspended from said carriers, a furnace, a vat for containing coating material, endless chains connected by said structure and arranged to separately and respectively move in horizontal and vertical planes thereon, each of said chains having fingers adapted to engage said carriers, the horizontally arranged chains adapted to move said carriers on said structure over said furnace and into engagement with the vertically arranged chains, a series of shafts carried by said structure, each having arms adapted to automatically move said carriers back to their position with respect to said structure when removed therefrom, means carried by said structure adapted when actuated by said vertical chains to shift said carriers upon their fingers to permit of the lowering and raising of said articles carried by the hangers and grip into and out of said vat, means carried by said structure adapted when engaged by the raised carrier to automatically shift the same from the fingers of said vertical chains back upon said structure and into re-engagement with the horizontally moving chains, a second shaft having arms extending into the path of travel of said carriers, and a third shaft movably supported by said second shaft having a finger, said second shaft when actuated by said carriers abutting against the arms adapted to raise said third shaft and the finger of said third shaft arranged when actuated to disengage the grip from said article to disconnect the same from said hanger.

In testimony whereof, we have hereunto set our signatures in the presence of two subscribing witnesses.

EDGAR A. CUSTER.
ROBERT A. PITMAN.

Witnesses:
GEO. W. REED,
J. WALTER DOUGLASS.